March 4, 1941.   C. C. KINKER   2,234,147
APPARATUS FOR CONDITIONING MOLTEN GLASS
Filed Oct. 7, 1938
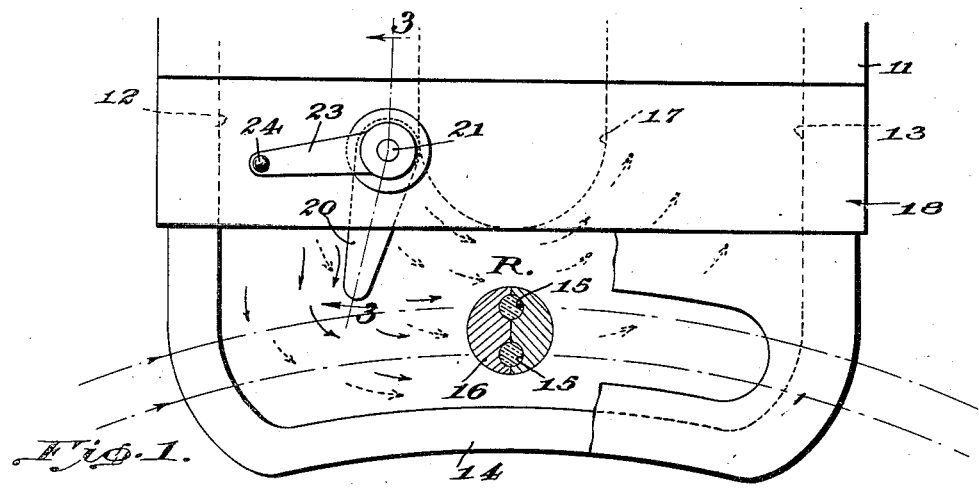
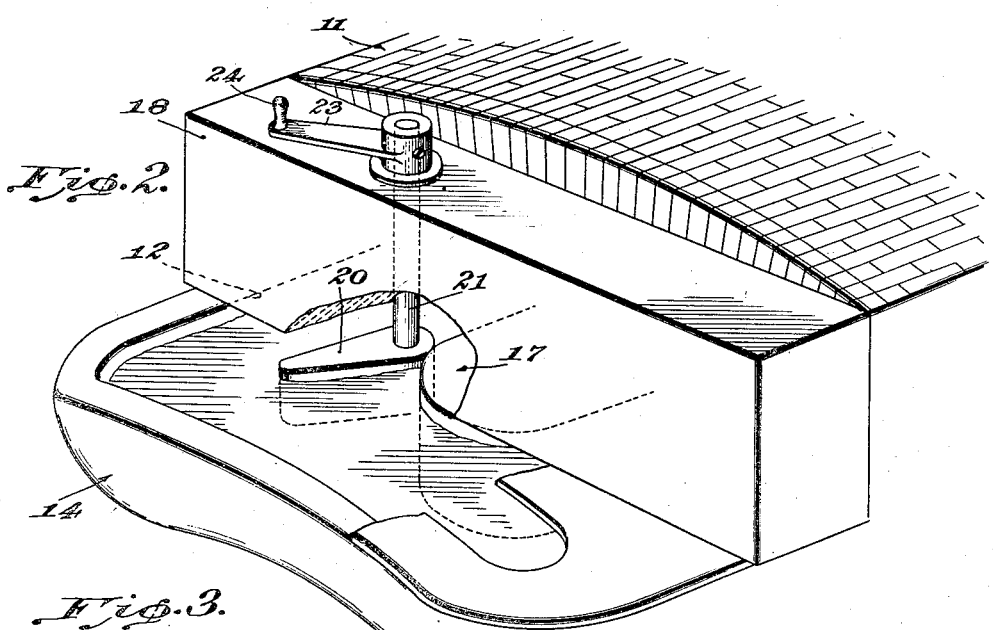
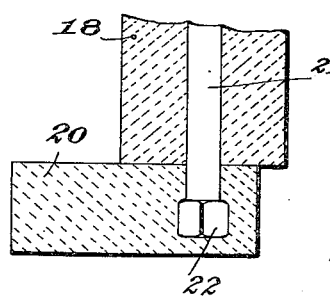
INVENTOR.
C. C. Kinker,
BY Rule + Hoge
ATTORNEYS.

Patented Mar. 4, 1941

2,234,147

UNITED STATES PATENT OFFICE 2,234,147

APPARATUS FOR CONDITIONING MOLTEN GLASS

Clarence C. Kinker, Montreal, Quebec, Canada, assignor to Owens-Illinois Glass Company, a corporation of Ohio Application October 7, 1938, Serial No. 233,841

5 Claims. (Cl. 49—56)

The present invention relates to apparatus for conditioning molten glass and more particularly to controlling the circulation of molten glass contained in a gathering pool or forehearth past a gathering region from which mold charges are repeatedly withdrawn by means of a suction gathering device which is periodically moved into gathering relation to the surface of the molten glass.

In the gathering of charges of molten glass from the surface of a gathering pool by a suction gathering device, it is difficult to obtain uniform temperature conditions in the gathering region with the result that uniform conditions of molding are frequently not attained. The differences in temperature of the molten glass at the gathering region are caused primarily by the different paths of travel of the glass in the forehearth. The portion of the stream in the vicinity of the outer lip of the forehearth having a greater distance to travel and being in intimate contact with the forehearth wall is more readily chilled due to heat losses arising from radiation and conduction than is the inner portion of the stream. Such chilling of the glass in the forehearth is augmented by the proximity of the gathering region to the opening of the furnace through which the suction gathering device periodically enters. Chilling is further augmented by the presence of chilled spots produced by the "tails" or "cut-offs" of semi-hardened glass created in the severing operation which fall back into the pool in a region that is already chilled sufficiently that immediate remelting of the "tails" is not effected. Still other factors such as contact of the surface of the glass with the relatively cold gathering means and with the shearing means tend to produce uneven temperature conditions in the furnace forehearth.

Where plural cavity molds are employed in the manufacture of glassware, the irregularity of temperature in the forehearth and especially the tendency for the glass in the outer regions thereof to be slightly cooler than the glass in the inner regions thereof gives rise to a condition wherein the inner mold cavities of the forming machine run a trifle colder than the outer mold cavities with the consequent result that uniform articles are not produced.

The principal object of the present invention is to overcome the above mentioned limitations that are attendant upon gathering operations whether single or plural cavity molds are employed by the provision of a practical means for effecting a more even temperature distribution throughout the forehearth. In carrying out the above mentioned object, the invention contemplates the provision of a means for deflecting the hot glass issuing from the inner regions of the furnace and flowing into the forehearth in such a manner that the glass moves directly into the gathering region and is prevented from short circuiting around the end of the usual dividing wall and returning to the furnace. Such deflection of the hot glass operates to speed up circulation of the glass in the peripheral regions of the forehearth and decrease the length of time during which the glass may radiate and conduct heat to the forehearth walls.

It is another object of the invention to provide a baffle for effecting such deflection of the hot glass which may be adjusted to accommodate varying conditions of furnace operation or different types of gathering devices.

A still further object of the invention is to provide a baffle for deflecting the hot glass issuing from the furnace and flowing into the forehearth which will withstand the high temperature of the glass and which therefore is possessed of a long life.

Other objects of the invention not at this time enumerated will become apparent hereinafter.

In the accompanying drawing:

Fig. 1 is a fragmentary top plan view of a furnace and forehearth construction showing the improved glass deflecting device applied thereto;

Fig. 2 is a perspective view thereof;

Fig. 3 is a sectional view taken substantially along the line 3—3 of Fig. 1; and Fig. 4 is a vertical transverse sectional view taken through a modified form of baffle member employed in connection with the present invention.

Referring now to Figs. 1 and 2, a melting tank or furnace 11 is connected through openings 12 and 13 with a forehearth 14 adapted to contain a supply body of molten glass from which charges of molten glass are adapted to periodically be withdrawn by suction from a gathering region R and supplied to the mold cavities 15 provided in the molds 16 of a conventional forming machine (not shown). The direction of movement of the molds 16 is indicated by the broken line arrows in Fig. 1. Hot glass issuing from the interior of the furnace 11 enters the forehearth through the opening 12 and, after passing around the end of the usual dividing wall 17 which is located below the furnace arch 18, leaves the forehearth and returns to the interior of the furnace through the opening 13. As stated while setting forth the objects of the present invention, glass issuing from the interior of the furnace in the absence of any further structure ordinarily flows more or less uniformly through the forehearth 14 following the paths indicated by the dotted line arrows in Fig. 1. Thus glass issuing from the interior of the furnace 11 in the vicinity of the dividing wall 17 ordinarily assumes a short path through the forehearth whereas glass more removed from the wall 17 follows a longer path. Glass issuing from the furnace 11 in the vicinity of the wall of the forehearth passes through the latter in close proximity to the outer edge thereof and becomes chilled through radiation and conduction to a greater extent than does the glass inwardly thereof, thus resulting in any or all of the unsatisfactory conditions outlined previously.

In order to speed up circulation of the hot glass passing in the vicinity of the outer wall of the forehearth 14 and thus reduce the time during which radiation and conduction of heat to and through the wall may occur, a baffle 20 extends into the molten glass in the pool beneath the arch 18 in the opening 12. The baffle member 20 is generally tapered and is formed of a heat resisting material. A rod 21 having an enlarged head 22 embedded in the baffle 20 extends upwardly through the arch 18 and is provided with a crank arm 23 above the arch by means of which the angular position of the baffle 20 may be adjusted. A handle 24 facilitates manipulation of the crank arm 23. The upper surface of the baffle is substantially flush with the underneath surface of the arch 18 while the pivoted end of the baffle is rounded and occupies a position in close proximity to the dividing wall 17. Thus it will be seen that in the position of the baffle shown in the drawing, hot molten glass issuing from the interior of the furnace will be prevented from short circuiting around the end of the dividing wall 17 and will follow the path of the full line arrows of Fig. 1 and will proceed directly to the gathering zone.

In Fig. 4 the baffle member 20' is provided with a coating of platinum 25' the melting point of which is above that of the glass. By such a construction the life of the baffle member 20' is materially increased.

Modifications may be resorted to within the spirit and scope of the appended claims.

I claim:

1. In combination, a furnace provided with an opening in its front wall, a forehearth extending forwardly of the furnace and communicating with the furnace through the opening, a wall dividing the opening into incoming and return channels leading to and from the forehearth, and a stationary glass deflecting baffle disposed in the incoming channel and extending from a position in close proximity to the dividing wall forwardly of the dividing wall and outwardly toward the outer wall of the forehearth and terminating short of the same.

2. In combination, a furnace provided with an opening in its front wall, a forehearth extending forwardly of the furnace and communicating with the furnace through the opening, a wall dividing the opening into incoming and return channels leading to and from the forehearth, a stationary glass deflecting baffle disposed in the incoming channel and extending from a position in close proximity to the dividing wall forwardly of the dividing wall and outwardly toward the outer wall of the forehearth and terminating short of the same, and means for adjusting the angular position of the baffle.

3. In combination, a furnace provided with an opening in its front wall, a forehearth extending forwardly of the furnace and communicating with the furnace through the opening, a wall dividing the opening into incoming and return channels leading to and from the forehearth, a stationary glass deflecting baffle disposed in the incoming channel and extending from a position in close proximity to the dividing wall forwardly of the dividing wall and outwardly toward the outer wall of the forehearth and terminating short of the same, and means extending through the top wall of the furnace for adjusting the angular position of the baffle.

4. The combination with a furnace provided with an opening in its front wall, a forehearth extending forwardly of the furnace and communicating with the furnace through the opening, and a wall dividing the opening into incoming and return channels leading to and from the forehearth, of a stationary glass deflecting baffle formed of refractory material disposed in the incoming channel and extending below the level of glass therein, one end of said baffle being uniformly rounded and extending into close proximity to the dividing wall, said baffle extending forwardly of the dividing wall outwardly toward the outer wall of the forehearth and terminating short of the same, a rod secured to the baffle adjacent said end, said rod extending upwardly through the top wall of the furnace, and a crank arm secured to the rod exteriorly of the furnace whereby the angular position of the baffle may be adjusted.

5. In combination, a furnace provided with an opening in its front wall, a forehearth extending forwardly of the furnace and communicating with the furnace through the opening and having a front wall and a pair of side walls, a wall dividing the opening into incoming and return channels leading to and from the forehearth, a baffle formed of refractory material disposed in the incoming channel and extending below the level of glass therein, the inner end of the baffle being uniformly rounded and being positioned in close proximity to the dividing wall inwardly of the front end of the latter, said baffle extending forwardly of the front end of the dividing wall and outwardly toward the juncture between the front wall and one side wall of the forehearth and terminating short of said walls, a rod secured to the baffle adjacent said inner end, said rod extending upwardly through the top wall of the furnace, and a crank arm secured to the rod exteriorly of the furnace whereby the angular position of the baffle may be adjusted.

CLARENCE C. KINKER.